(12) United States Patent
Wakai et al.

(10) Patent No.: US 6,230,373 B1
(45) Date of Patent: May 15, 2001

(54) SLIDE FASTENER MADE OF SYNTHETIC RESIN

(75) Inventors: Tatsumi Wakai, Kurobe; Yoshiharu Yamaguchi, Namerikawa; Mutsuo Hirota, Toyama-ken; Toyosaku Ogura, Kurobe; Tsutomu Hamatani, Namerikawa, all of (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/413,434

(22) Filed: Oct. 6, 1999

Related U.S. Application Data (62) Division of application No. 09/034,566, filed on Mar. 4, 1998.

(30) Foreign Application Priority Data

Mar. 5, 1997 (JP) .................................................. 9-065619

(51) Int. Cl.$^7$ .................................................. A44B 19/00
(52) U.S. Cl. .................................. 24/381; 24/391; 24/403
(58) Field of Search ............................. 24/381, 394, 397, 24/398, 401, 415, 433, 434, 436

(56) References Cited

U.S. PATENT DOCUMENTS

| | | | |
|---|---|---|---|
| 3,765,348 | * | 10/1973 | Jabor et al. . |
| 3,921,260 | * | 11/1975 | Frohlich . |
| 4,112,553 | * | 9/1978 | Weitzner ............................. 24/433 X |
| 4,162,892 | * | 7/1979 | Wright et al. . |
| 4,609,375 | * | 9/1986 | Wilson et al. . |
| 4,651,389 | * | 3/1987 | Yoshida et al. ......................... 24/433 |

OTHER PUBLICATIONS

Recycling of Polyester Clothing Due Here Soon, Comline–Chemicals & Materials, Nov. 1994.*

* cited by examiner

*Primary Examiner*—James R. Brittain
(74) *Attorney, Agent, or Firm*—Finnegan, Henderson, Farabow, Garrett & Dunner, L.L.P.

(57) ABSTRACT

Disclosed is a recyclable slide fastener having substantially all the component parts thereof made of the same type of synthetic resin material. In the fundamental embodiment of the slide fastener having a pair of fastener tapes and coupling elements fixed to the longitudinal edges of the fastener tapes, they are made of a synthetic resin material of the same type selected from the group consisting of a polyamide resin, a polyester resin, a polyolefin resin, and a vinyl chloride resin. When the slide fastener comprises sewing threads for the fixation of the coupling elements to the fastener tapes and/or core cords extended as inserted through the individual coupling elements, they are made of the same type of synthetic resin as the fastener tapes and the coupling elements. In the slide fastener of the type having upper and lower stop members provided respectively at the upper and lower ends of the rows of coupling elements or the open-link type slide fastener which has a pin-and-box separator and a pair of reinforcing sheet-like members fixed to the lower end portions of the fastener tapes, they are made of the same type of synthetic resin material as the other component parts mentioned above. Preferably the slider is also made of the same type of synthetic resin material as the other component parts mentioned above.

11 Claims, 9 Drawing Sheets

SLIDE FASTENER MADE OF SYNTHETIC RESIN

This application is a division of U.S. application Ser. No. 09/034,566, filed Mar. 4, 1998.

BACKGROUND OF THE INVENTION

1. Field of the Invention

This invention relates to a recyclable slide fastener made of a synthetic resin or to a slide fastener made of a synthetic resin recyclable and also simultaneously dyeable in the same hue by post-dyeing or piece dyeing.

2. Description of the Prior Art

In recent years, the recovery and reclamation of industrial waste and discarded articles, or the so-called recycle, has been in vogue with a view to safeguarding the earth's environment and promoting the effective utilization of resources. In the case of such molded articles of thermoplastic substances as, for example, PET (polyethylene terephthalate) bottles, the practice of recovering used articles, remelting the articles, molding the melt, and putting the produced articles to reuse is now on the verge of being reduced to an enterprise.

In the case of slide fasteners, however, since the component parts thereof are numerous and further since they are made of various materials, the idea of separating such slide fasteners from discarded clothes, bags, tents, etc., recovering them as sorted into such different parts as sliders, fastener tapes, coupling elements, upper and lower stop members, and pin-and-box separators, and putting the recovered parts to reuse is nearly impracticable and has never been reduced to practice to date.

Every year the factories engaging in the manufacture of slide fasteners made of synthetic resins are yielding large volumes of waste plastic materials such as defective products, severed edges, and loose threads from their production lines as industrial waste. The disposal of these industrial waste calls for a huge expense. In the circumstances, the effective reclamation of these industrial waste has been growing into an increasingly important task.

The slide fasteners made of synthetic resins, in addition to the problems mentioned above, incur such problems as concern the properties which are expected of any slide fastener.

In the case of a slide fastener, owing to the discrepancies existing between the various mechanical properties thereof and the characteristics expected of the individual component parts thereof such as the durability thereof to withstand a sliding motion of the slider, it is considered difficult to manufacture all the component parts with synthetic resins. Further, in the reclamation of slide fasteners made of synthetic resins from the discarded plastic materials, since the individual parts are made of varying materials, the raw materials which are managed to be recovered as sorted at all inevitably suffer degradation of purity and, as a result, do not allow manufacture of products satisfying various characteristics expected of any slide fastener. The slide fasteners, therefore, defy all attempts at recycling them on the same principle as governs the recycle of such sundries as the PET bottles.

Then, the slide fasteners are possessed of decorative factors besides their functional factors. They are required to be dyed in various colors to meet diversified consumers' needs. Particularly in recent years, the desirability of manufacturing slide fasteners numerous in color yet small in lot size has come to find enthusiastic recognition. In the case of the slide fasteners made of synthetic resins which have been reclaimed from discharged plastic materials, however, since the raw materials themselves are already colored with various pigments and dyes, it is generally difficult to manufacture products whose component parts are harmoniously and homogeneously colored. The slide fasteners of such synthetic resins as have been reclaimed from the discarded plastic materials, therefore, are preferred to be simultaneously dyed in one and the same colors by means of the piece dyeing.

Even when newly produced synthetic resin materials (virgin materials) are used, however, since the individual component parts such as, for example, those used in fastener tape fibers and those used for the formation of coupling elements, are different in kind of synthetic resin and in kind and quantity of pigment, the fastener tapes and the coupling elements during the course of piece dyeing manifest difference in ability to absorb dye. In the case of an injection molded fastener, since the yarns used for forming the fastener tapes have been drawn in the process of production and the material injected for forming the coupling elements has not been drawn and, therefore, they manifest a difference in degree of crystallization, the fastener tapes and the coupling elements during the course of piece dyeing betray a difference in ability to absorb dye. As a result, it is difficult to dye simultaneously the individual component parts harmoniously and homogeneously. Worse still, it has been held that this simultaneous dyeing is impracticable when the injection molded fasteners use reclaimed plastic materials.

SUMMARY OF THE INVENTION

The primary object of the present invention, therefore, is to provide recyclable slide fasteners made of synthetic resins for the purpose of enabling discarded plastic materials and discarded slide fasteners of synthetic resins emanating from the production line of slide fasteners of synthetic resins to be effectively reclaimed as raw materials.

Another object of the present invention is to provide a slide fastener which not only fits recycle but also satisfies the characteristics expected of any slide fastener and further enables the component parts thereof to be post-dyed harmoniously in one homogeneous hue.

The present invention, to accomplish the objects mentioned above, provides a slide fastener having substantially all the component parts thereof made of the same type of synthetic resin material.

In the fundamental embodiment of the slide fastener according to the present invention having a pair of fastener tapes and coupling elements fixed to the longitudinal edges of the fastener tapes, the fastener tapes and the coupling elements mentioned above are made of synthetic resin materials of the same type selected from the group consisting of a polyamide resin, a polyester resin, a polyolefin resin, and a vinyl chloride resin.

When the slide fastener comprises sewing threads for the fixation of the coupling elements to the fastener tapes and/or core cords extended as inserted through the individual coupling elements in the longitudinal direction, the sewing threads and/or the core cords may be made of the same type of synthetic resin as the fastener tapes and the coupling elements mentioned above.

Further, in the slide fastener of the type having upper and lower stop members provided respectively at the upper and lower ends of the rows of coupling elements, the upper and lower stop members may be made of the same type of synthetic resin material as the other component parts mentioned above.

In the open-link type slide fastener which has a pin-and-box separator and a pair of reinforcing sheet-like members formed integrally or not integrally with the pin-and-box separator (lacking a lower stop member), which have fixed to the lower end portions of the fastener tapes, the pin-and-box separator and the reinforcing sheet-like members mentioned above may be made of the same type of synthetic resin material as the other component parts mentioned above.

Preferably in any of the cases mentioned above, the slider may be made of the same type of synthetic resin material as the other component parts mentioned above.

BRIEF DESCRIPTION OF THE DRAWINGS

Other objects, features, and advantages of the invention will become apparent from the following description taken together with the drawings, in which.

DETAILED DESCRIPTION OF THE INVENTION

The present inventors, after pursuing a diligent study on slide fasteners made of synthetic resins, have found that the slide fasteners manufactured from polyamide resins such as nylon 6, nylon 66, nylon 11, and nylon 12, polyester resins such as polyethylene terephthalate and polybutylene terephthalate, polyolefin resins such as polyethylene and polypropylene, or vinyl chloride resins fulfill such characteristics as mechanical properties and durability to withstand the friction due to the sliding movement of a slider which are expected of any slide fastener and are recyclable as well and further that particularly slide fasteners manufactured from polyesters or polyamides permit the component parts thereof to be simultaneously dyed in one and the same hue by means of piece dyeing. The present invention has been perfected as a result. To be specific, the fundamental technical idea of the, present invention consists in manufacturing all the component parts of a slide fastener with an essentially identical synthetic resin material and using as the material essentially a polyamide resin, a polyester resin, a polyolefin resin, or a vinyl chloride resin. It is provided, however, that there are times when the slider itself should be manufactured from other synthetic resin or a metal, depending on the function or construction which is expected from the slide fastener. In this case, the slider can be manufactured from the material which is so needed. In the case of the slide fastener using the slider of this description, it is relatively easy to recover the slider selectively from the discarded slide fastener and the discarded plastic materials emanating from the production line can be wholly reclaimed.

As concrete examples of the manner in which the discarded plastic materials emanating from the production line of slide fasteners of synthetic resins and the synthetic resin materials recovered from discarded slide fasteners of synthetic resins are reclaimed, reproduction of slide fasteners of synthetic resins, utilization as raw materials for other textile products and molded articles, utilization as powder fuels, and conversion into gases and oils may be cited.

In the reproduction of slide fasteners of synthetic resins, the question as to what kinds of synthetic resin materials are suitable for this purpose is judged depending on the form of a slide fastener as a product and the constructions of individual component parts of a slide fastener. Then, the question whether or not the slide fasteners manufactured by using discarded plastic materials can be simultaneously dyed by piece dyeing depends on the kinds of relevant synthetic resins.

Now, the modes of embodying the present invention in the component parts of a slide fastener will be specifically described below with reference to various slide fasteners which are illustrated in the accompanying drawings.

Figure 1:
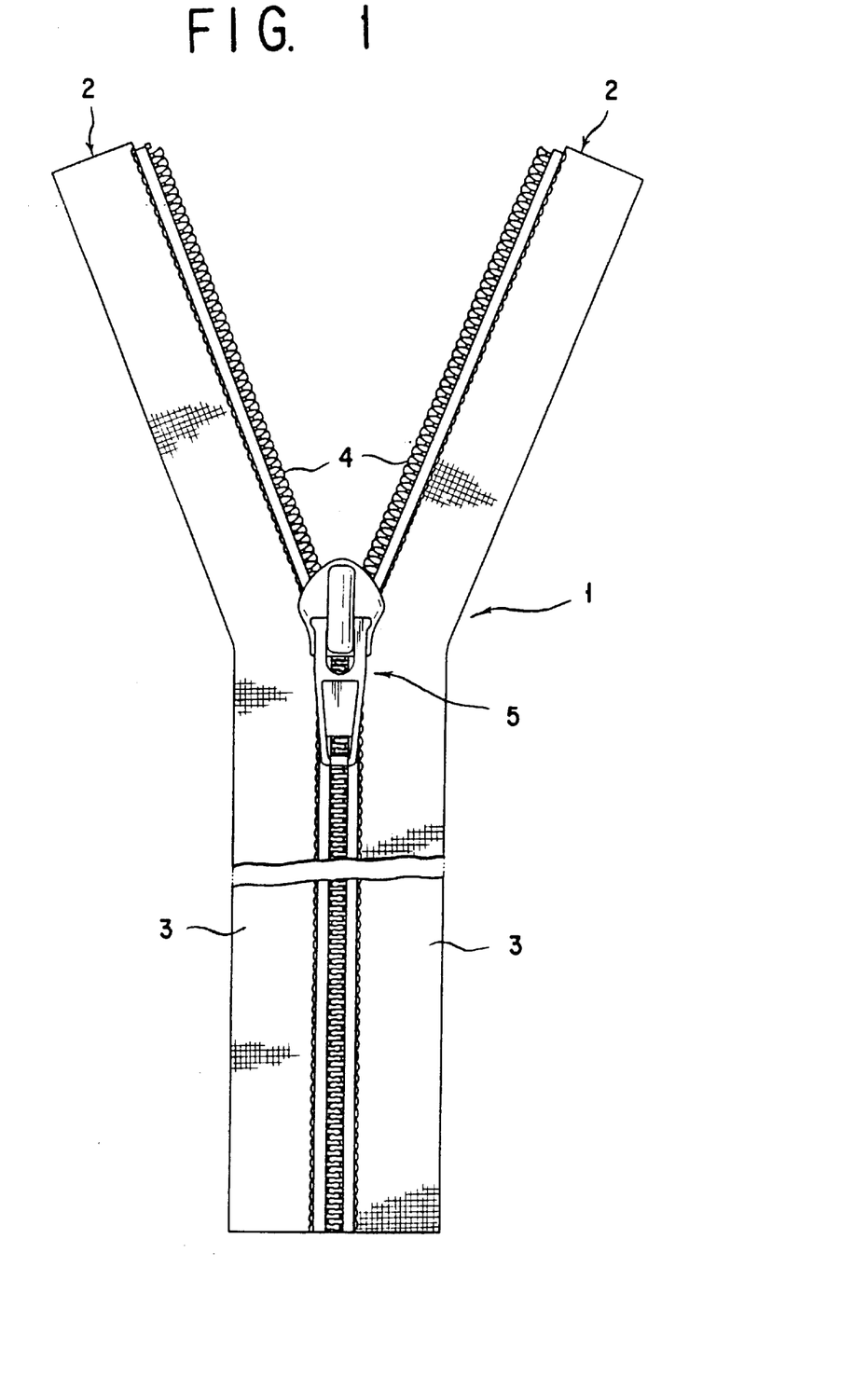
FIG. 1 is a plan view illustrating one basic form of the slide fastener made of a synthetic resin according to the present invention.

FIG. 1 illustrates a slide fastener 1 which is used for opening and closing the opening in a garment or a bag and depicts the form of a product having the upper and lower ends of laterally paired fastener stringers 2 cut off. The fastener stringers 2 are composed of fastener tapes 3 made of synthetic resin and a row of coupling elements (coiled coupling elements) 4 made of synthetic resin attached fast to each of the opposed longitudinal edges of the fastener tapes 3. The fastener tapes 3 are formed by weaving and/or knitting synthetic resin fibers, manufactured from a non-woven fabric, or made of a sheet of synthetic resin. The coupling elements 4 are known in various forms such as, for example, those of the type obtained by injection molding the individual coupling elements and simultaneously attaching them fast to the edges of the fastener tapes, the continuous coupling elements such as the coiled coupling elements obtained by winding a monofilament of synthetic resin in the shape of a coil and the so-called zigzag coupling elements obtained by alternately connecting vertically in a zigzagging pattern in the longitudinal direction the portions bent in the shape of a letter U in the lateral direction in a plane, and the extrusion molded coupling elements obtained by attaching the opposite end portions of the individual coupling elements by means of extrusion molding to the two separate connecting cords (core cords) laid parallel to each other in the longitudinal direction thereby forming a composite resembling a ladder and bending the composite in the shape of a letter U around the longitudinal center line thereof. These examples of various coupling elements will be described afterward with reference to the relevant drawings. Then, the coiled coupling elements which include a core cord and a sewing thread among the component parts thereof will be also described afterward with reference to the relevant drawings. The reference numeral 5 denotes a slider which is slidable along the opposed rows of coupling elements for making and breaking engagement of the coupling elements.

Figure 2:
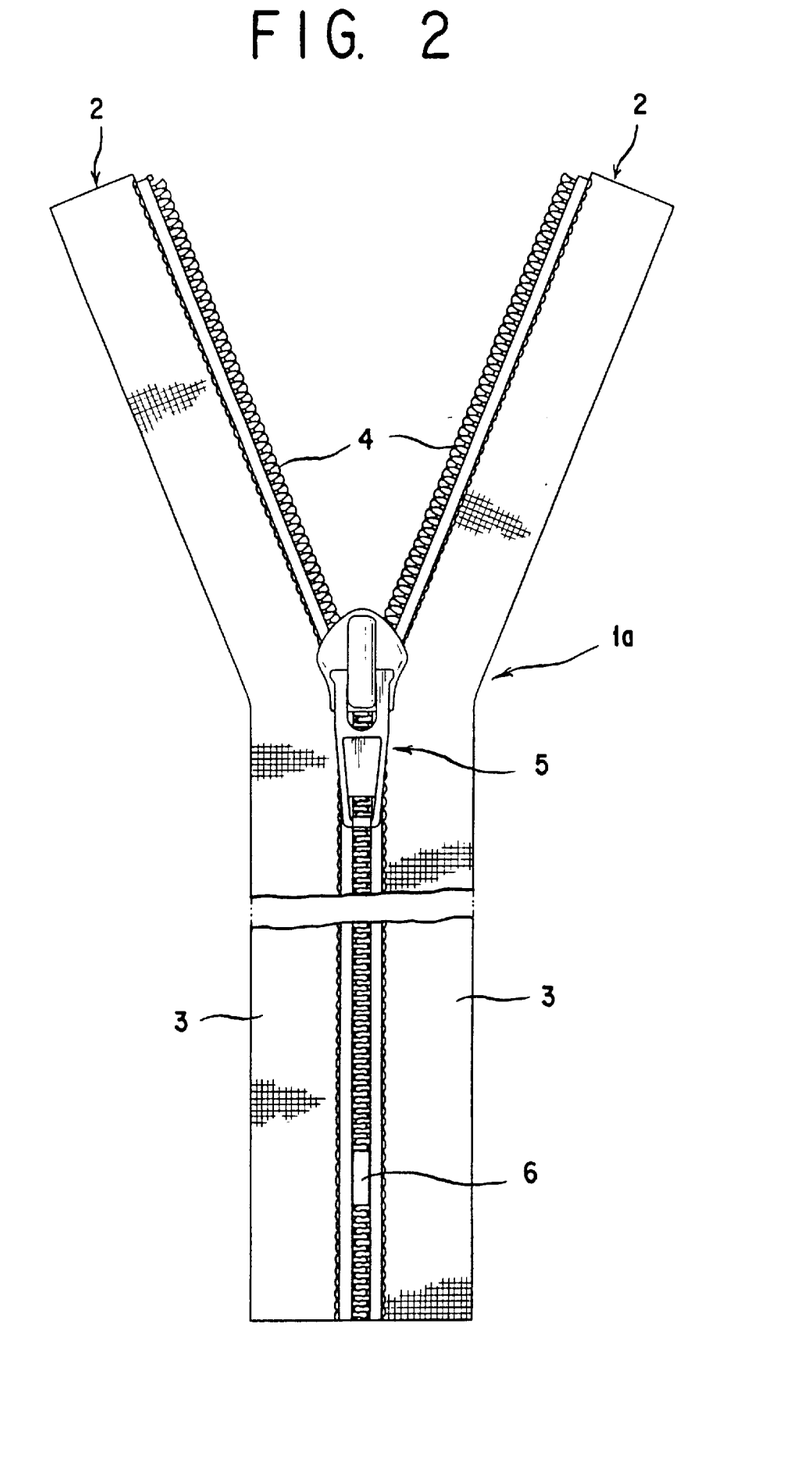
FIG. 2 is a plan view illustrating another form of the slide fastener made of a synthetic resin according to the present invention.

A slide fastener 1a illustrated in FIG. 2 is in a form having the upper ends of the two fastener stringers 2 cut off. It is different from the slide fastener illustrated in FIG. 1 in respect that a lower stopping part 6 is formed by fusing the prescribed lower portions of the engaged rows of coupling elements 4.

Figure 3:
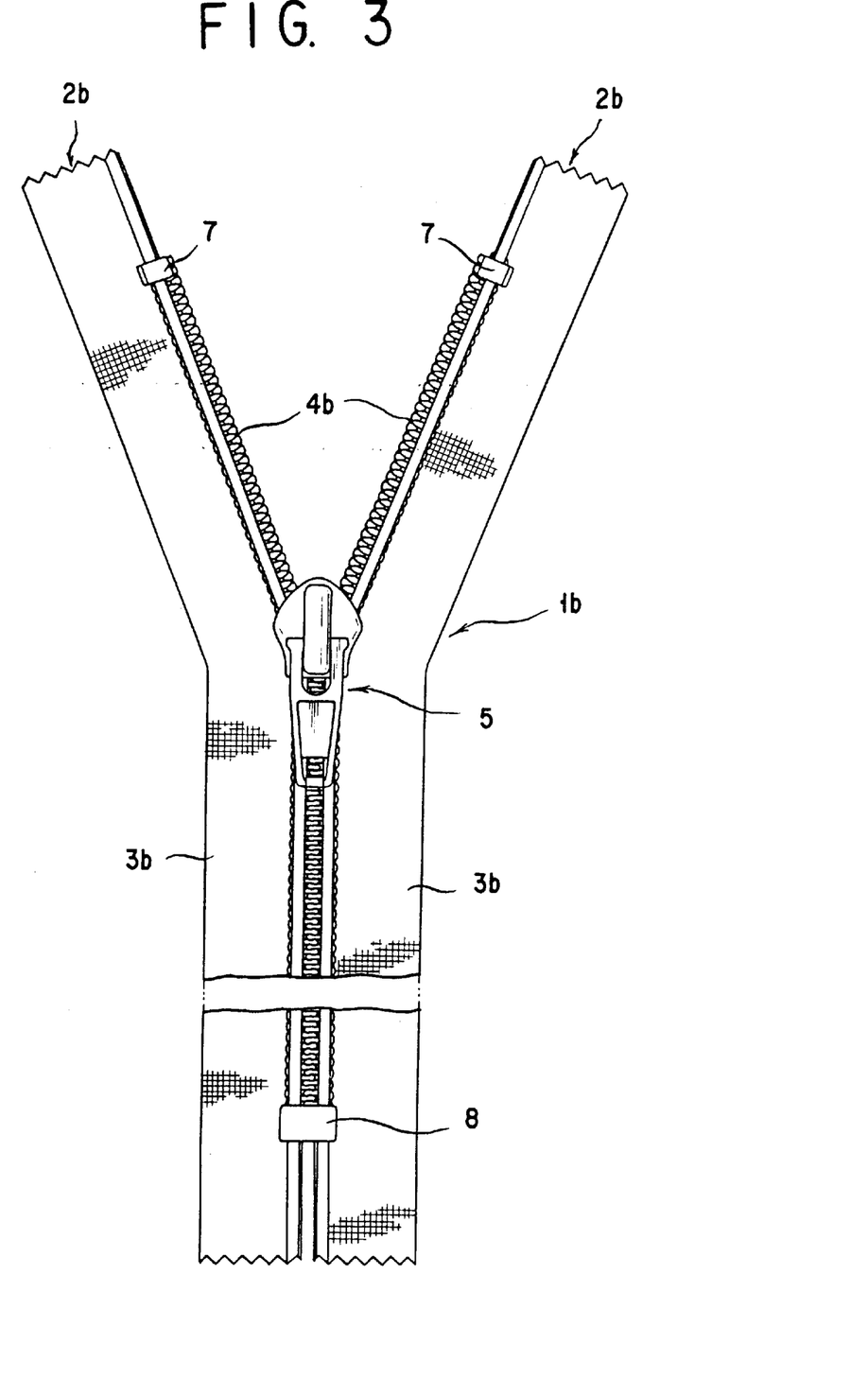
FIG. 3 is a plan view illustrating still another form of the slide fastener made of a synthetic resin according to the present invention.

A slide fastener 1b illustrated in FIG. 3 is different from the slide fastener illustrated in FIG. 1 in respect that upper stop members 7 are attached respectively to the upper ends of the rows of coupling elements 4b attached fast to fastener tapes 3b of fastener stringers 2b and a lower stop member 8 is attached to the lower ends thereof.

Figure 4:
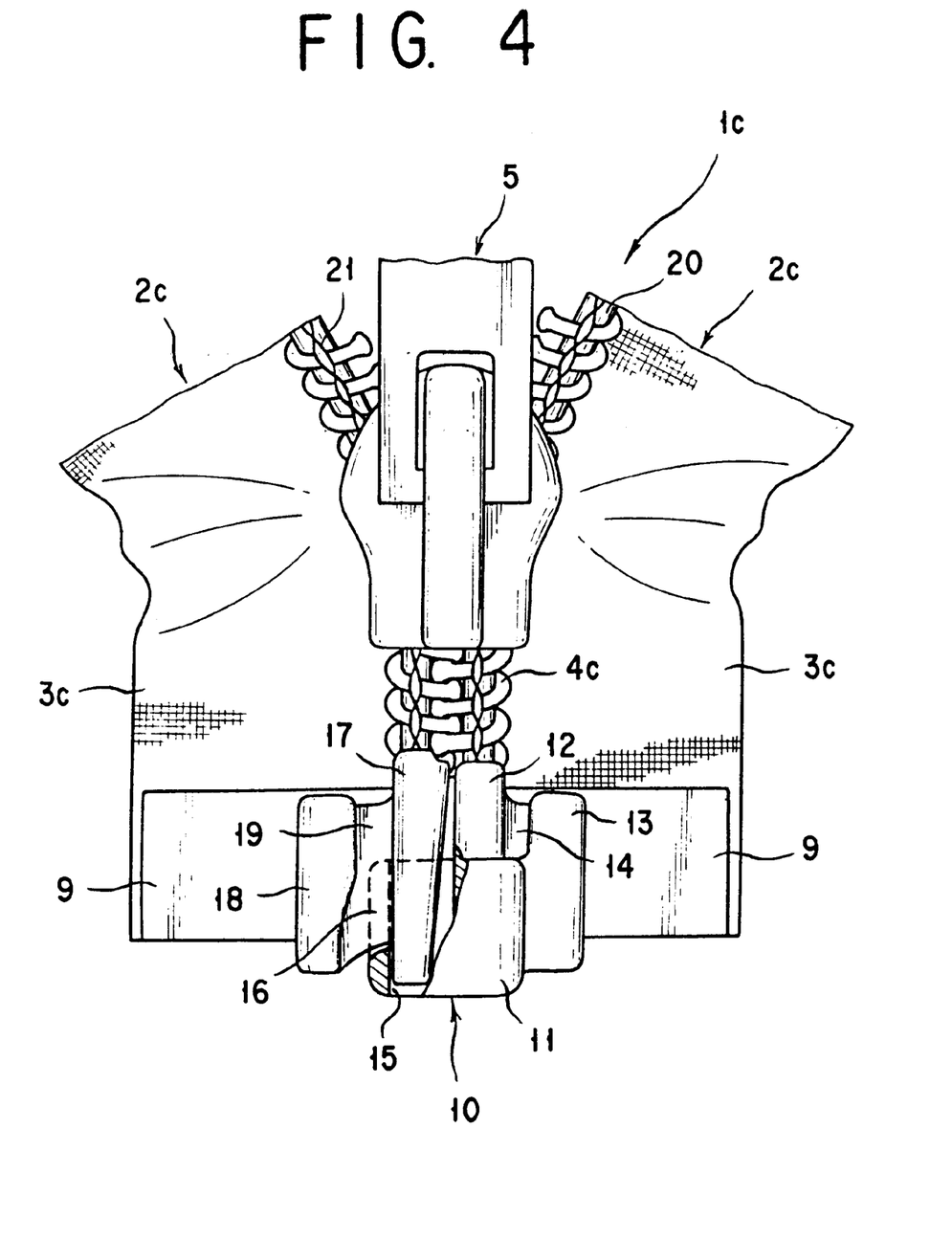
FIG. 4 is a partially cutaway plan view illustrating another form of the slide fastener made of a synthetic resin according to the present invention.

FIG. 4 illustrates an open-link type slide fastener 1c. To the lower end portions of fastener tapes 3c of fastener stringers 2c, reinforcing sheet-like members (taffeta) 9 are welded through the medium of an adhesive layer (not shown). A box member 11 of a pin-and-box separator 10 is attached to the inner edge of one of the opposed reinforcing sheet-like members 9 and a butterfly rod or pin 17 is attached to the inner edge of the other reinforcing sheet-like member 9. The box member 11 is formed integrally with a guide projecting part 13 adjoining the box member 11 and a box rod 12 and a groove 14 is formed as interposed between the box rod 12 and the guide projecting part 13 so as to admit therein the lower end part of the slider 5 by slippage. Similarly, a guide groove 19 is formed between the butterfly rod 17 and a guide ridge 18 formed integrally with the adjoining butterfly rod 17. A butterfly rod inserting hole 15 is formed as pierced in the vertical direction in the left side portion of the box member 11 and a lateral groove 16 is formed on the outer wall of the butterfly rod inserting hole 15. When the butterfly rod 17 is inserted into the butterfly rod inserting hole 15 of the box member 11, therefore, the insertion can be smoothly carried out because the inner side of the lower end of the guide ridge 18 slide on the edge of the lateral groove 16 of the box member 11 so as to guide the butterfly rod 17.

With reference to FIG. 4, the reference numeral 20 denotes a core cord which is inserted in the longitudinal direction through the empty space inside the spiral of the coiled coupling element 4c and the reference numeral 21 denotes a sewing thread sewing the core cord 20 and the coiled coupling element 4c along the longitudinal edge of the fastener tape 3c.

The pin-and-box separator does not need to be limited to what is illustrated in FIG. 4. The so-called reverse open-link type using the same box member as in the construction of the slider 5 and enabling the slider fastener to effect junction and disjunction of the opposed rows of coupling elements at the lower end thereof, for example, has been known as one version thereof.

Further, the embodiment, as illustrated in the diagram, uses reinforcing sheet-like members which are formed separately of the pin-and-box separator and welded to the lower end portion of each of the fastener tapes. The reinforcing sheet-like members do not need to be limited to this particular construction. The reinforcing members can be integrally formed with the pin-and-box separator as found, for example, in a construction which has a sheet-like portion produced by injection molding a synthetic resin material integrally with a box member or a butterfly rod and fixed to the entire width of the fastener tape or a construction which has slits of an arbitrarily selected pattern inserted in a sheet-like portion thereby imparting flexibility thereto.

Figure 5:
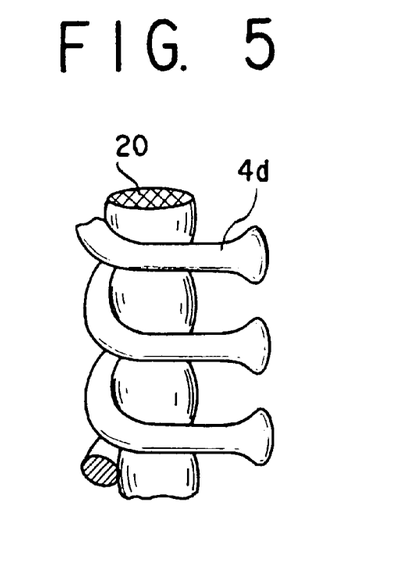
FIG. 5 is a fragmentary plan view of a spiral coil coupling element provided with a core cord.
Figure 6:
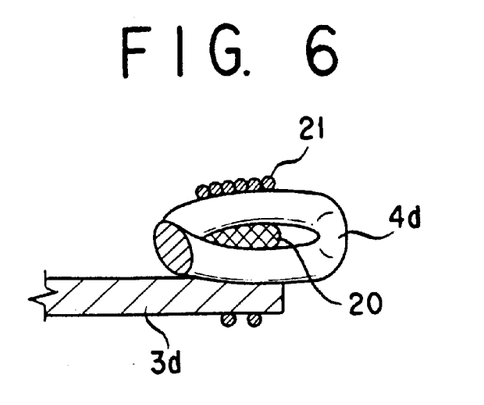
FIG. 6 is a fragmentary cross-sectional view illustrating one state of fixing the coiled coupling element provided with a core cord shown in FIG. 5 to a fastener tape.
Figure 7:
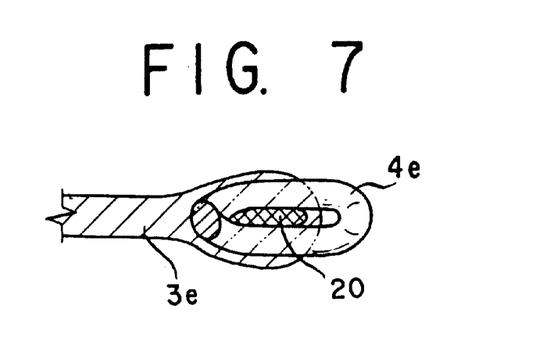
FIG. 7 is a fragmentary cross-sectional view illustrating another state of fixing the coiled coupling element provided with a core cord shown in FIG. 5 to a fastener tape.
Figure 8:
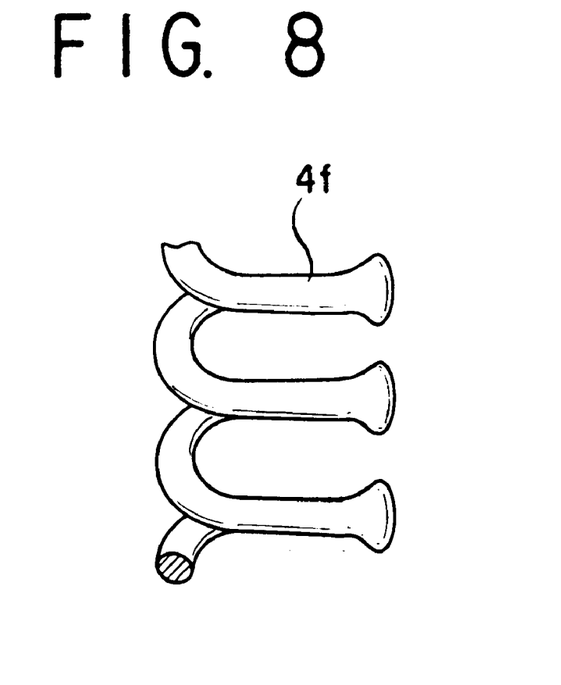
FIG. 8 is a fragmentary plan view of a coiled coupling element devoid of a core cord.
Figure 9:
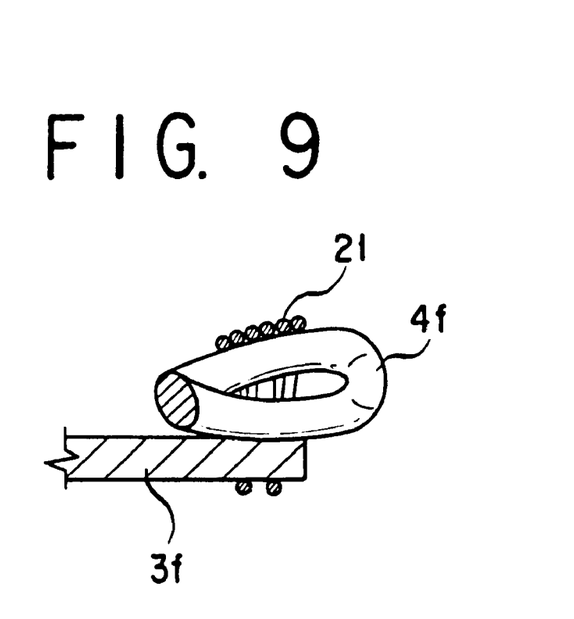
FIG. 9 is a fragmentary cross-sectional view illustrating a state of fixing the coiled coupling element shown in FIG. 8 to a fastener tape.

FIG. 5 through FIG. 9 illustrate examples of coupling elements which are formed by coiling a monofilament of synthetic resin. FIG. 6 illustrates an example of having sewn to the longitudinal edge of a fastener tape 3d with a sewing thread 21 a coiled coupling element 4d having the core cord 20 of synthetic resin fibers inserted through the empty space within a spiral in the longitudinal direction as illustrated in FIG. 5. In contrast, FIG. 7 illustrates an example of having a coiled coupling element 4e attached to the longitudinal edge of a fastener tape 3e as encircled with the tape at the same time that the tape is woven. FIG. 9 illustrates an example of having sewn to the longitudinal edge of a fastener tape 3f with the sewing thread 21 a coiled coupling element 4f having no core cord inserted through the-empty space within a spiral as illustrated in FIG. 8.

Figure 10:
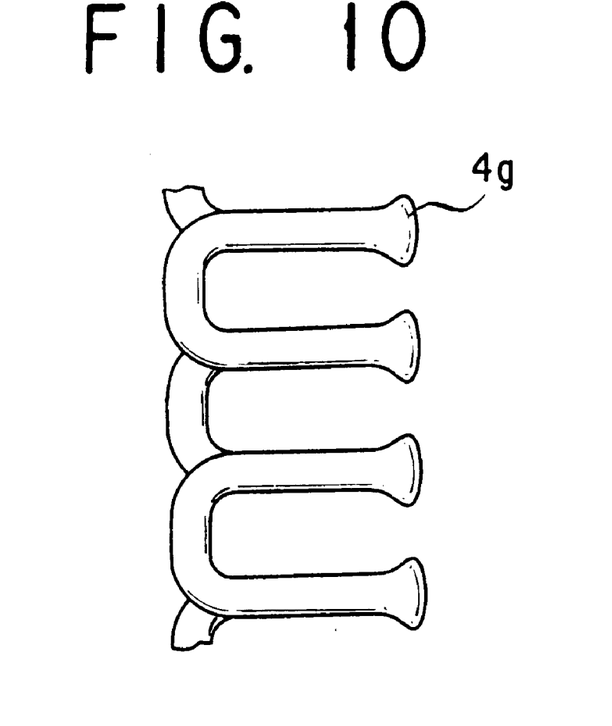
FIG. 10 is a fragmentary plan view of a zigzag-like coupling element.
Figure 11:
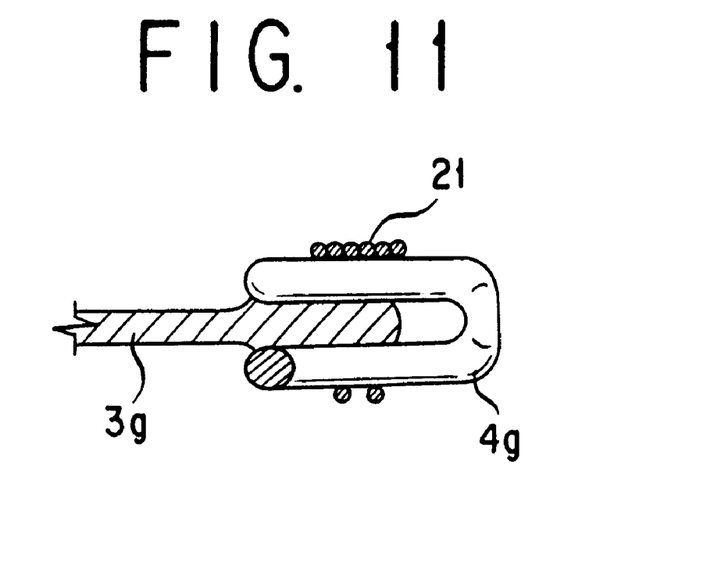
FIG. 11 is a fragmentary cross-sectional view illustrating a state of fixing the zigzag coupling element shown in FIG. 10 to a fastener tape.

FIG. 10 illustrates a so-called zigzag coupling element 4g which is obtained by forming U-shaped bends of a monofilament of synthetic resin each lying laterally in a plane and alternately connecting the U-shaped bends vertically in the longitudinal direction. The vertically adjacent bends are sewn with the sewing thread 21 to the longitudinal edge of a fastener tape 3g nipped therebetween.

Figure 12:
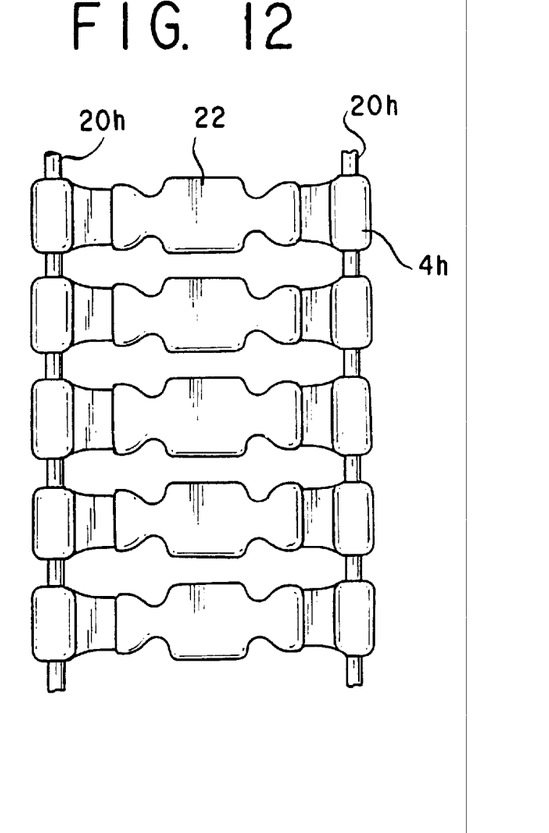
FIG. 12 is a fragmentary plan view of coupling elements fixed by extrusion molding to connecting cords.
Figure 13:
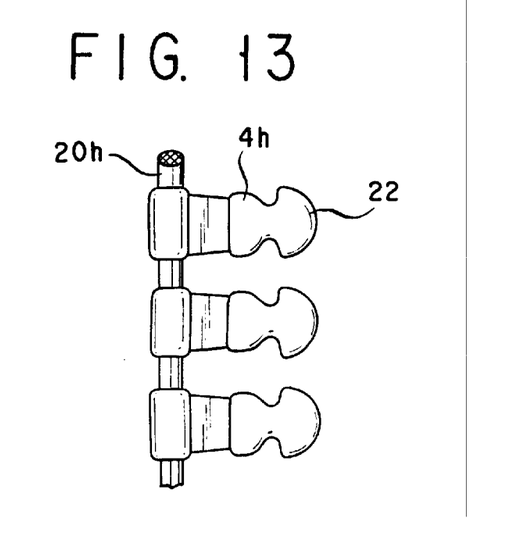
FIG. 13 is a fragmentary plan view illustrating the coupling elements shown in FIG. 12 as posed in a state bent in the shape of a letter U around the engaging portion thereof as the center.
Figure 14:
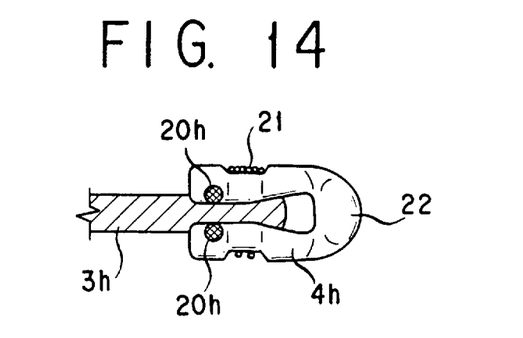
FIG. 14 is a fragmentary cross-sectional view illustrating a state of fixation of the coupling elements shown in FIG. 12 and FIG. 13 to fastener tape.

FIG. 12 through FIG. 14 illustrate an example of attaching the opposite end portions of regularly spaced individual coupling elements 4h by means of an extruder to two separate connecting cords (core cords) 20h laid parallel to each other in the longitudinal direction thereby forming a composite resembling a ladder as illustrated in FIG. 12, bending the composite in the shape of a letter U around an engaging portion 22 as a center as illustrated in FIG. 13, and sewing the bent composite to the longitudinal edge of a fastener tape 3h with the sewing thread 21 as illustrated in FIG. 14.

Figure 15:
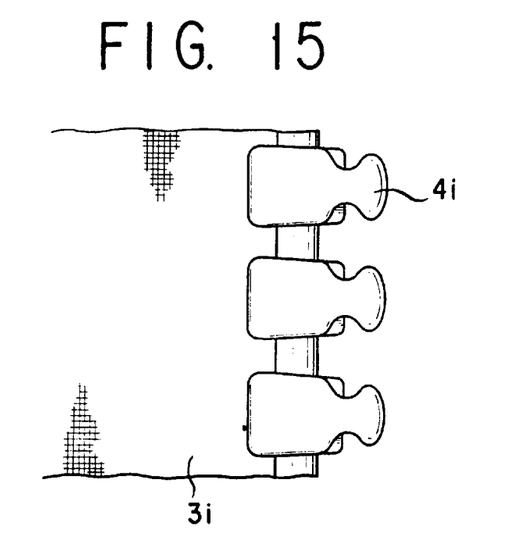
FIG. 15 is a fragmentary plan view illustrating a slide fastener having individual coupling elements of synthetic resin attached fast to the longitudinal edge of a fastener tape having a circularly swelled cross section.
Figure 16:
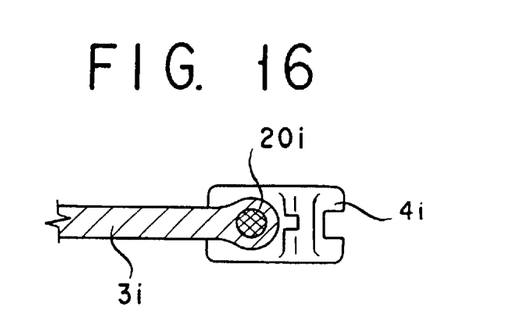
FIG. 16 is a fragmentary cross-sectional view illustrating the slide fastener shown in FIG. 15.

In contrast, FIG. 15 and FIG. 16 illustrate an example of attaching a core cord 20i by weaving into the longitudinal edge of a fastener tape 3i at the same time that the tape is woven and attaching individual coupling elements 4i of synthetic resin by injection molding as regularly spaced to the longitudinal edge swelled into a circular cross section of the fastener tape 3i formed as described above.

The recyclable slide fastener of synthetic resin according to the present invention can be applied not only to the slide fasteners of the types illustrated in FIG. 1 through FIG. 16 but also to various fastener products. It can be applied, for example, to a railed fastener product, i.e. a fastener of the type having a groove formed along the edge of one of paired opposed sheet members of a container bag and a ridge matched to the groove and formed similarly on the other sheet member such that the bag is closed by bringing the groove and the ridge into mutual engagement. Likewise in this type of slide fastener, a slider adapted to slide along the opposed edges of the bag for the purpose of closure is utilized.

The selection of the type of fastener product for proper application of the reclaimed plastic material depends also on the kind of synthetic resin to be used for the product. Generally, nylon 6 and nylon 66 among other polyamide resins and such polyolefin resins as polyethylene and polypropylene are suitable for such slide fasteners as are shown in FIG. 1 through FIG. 16. Nylon 11 and nylon 12 among other polyamide resins and such vinyl chloride resins as polyvinyl chloride and various copolymers of vinyl chloride with vinyl acetate, vinylidene chloride, acrylonitrile, ethylene, or propylene are suitable for the railed fastener product. The polyester resins are suitable for both the slide fasteners and the railed fasteners. Now, the preferred modes of application of varying synthetic resin materials will be described below.

When the synthetic resin material is polyethylene terephthalate (PET), basically the PET can be used for all the component parts of a slide fastener. Preferably, however, the slider which is required to possess high mechanical strength is made of polybutylene terephthalate (PBT) instead, with the PBT in the body portion of the slider reinforced with such reinforcing fibers as glass fibers. In recycling the slide fastener of polyester answering this description, it is preferable to remove the slider from the slide fastener discarded as no longer useful and utilize the remainder of the slide fastener exclusively for the sake of reclamation. When the used slide fastener is wholly recovered and put to reclamation, the material that is obtained at all is in the form of a PET/PBT polymer blend. In the case of such an open-link type slide fastener as illustrated in FIG. 4, the pin-and-box separator is preferred to be made of PBT likewise on account of mechanical strength. In any of the cases mentioned above, however, the component parts of the slide fasteners can be simultaneously dyed in the same hue by piece dyeing because the materials for the component parts are invariably polyester. Though various dyes are usable for the piece dyeing, a disperse dye is used preferably. The disperse dye that can be used herein is known in various types such as, for example, quinone type disperse dyes, azo type disperse dyes, and anthraquinone type disperse dyes. Various dyeing assistants in popular use such as leveling agents and dye fastness promoters can be additionally incorporated in a dye bath as is usually practiced. While various methods are available for the dyeing under discussion, the method of beam dyeing proves to be advantageous.

In setting the used polyester slide fastener to the process of recycle, the reclaimed polyester may be used for manufacturing a slide fastener again or for manufacturing other fastener products such as face fasteners, textile products, and molded articles such as binding bands for packages and containers. When the reclaimed polyester is used as the raw material for other molded articles, it may incorporate therein a varying filler like such reinforcing fibers as glass fibers, carbon fibers, or aramid fibers or it may be blended with such other thermoplastic resin as PBT. The same remarks hold good for the polyolefins and the polyamides which will be described afterward. In manufacturing a slide fastener by using reclaimed PET, the slider, pin-and-box separator, coupling elements, and sewing thread which require high mechanical strength are preferred to use virgin PET or a blend of virgin PET with reclaimed PET. As concrete examples of the main use found for the reclaimed PET, therefore, binding bands and other molded articles may be cited in addition to such component parts of a fastener as fastener tapes, a core cord, and upper and lower stop members.

When the synthetic resin material is a polyolefin, particularly polypropylene (PP), all the component parts of a slide fastener, i.e. fastener tapes, coupling elements, a pin-and-box separator, reinforcing sheet-like members, upper and lower stop members, a sewing thread, a core cord, and a slider can be made of PP. In the case of a slide fastener which is made wholly of PP, therefore, the recovery of the used product has no use for the work of selecting only the slider. That is to say, the used product can be wholly recovered and utilized for the purpose of reclamation. Further, the reclaimed PP, similarly to the reclaimed polyester mentioned above, can be used as the raw material for textile products and such molded articles as binding bands and containers and also as the raw material for the component parts of a slide fastener.

The slide fastener made wholly of PP, however, is not easily colored by piece dyeing. For this slide fastener to be easily colored, therefore, it becomes necessary to manufacture chips which are colored with a pigment.

When the synthetic resin material is a polyamide, all the component parts of a slide fastener except a slider, i.e. fastener tapes, coupling elements, a pin-and-box separator, reinforcing sheet-like members, upper and lower stop members, a sewing thread, and a core cord, can be made of the polyamide. The slider in this slide fastener can be made of the PBT mentioned above or a metal. When the slide fastener of polyamide answering this description is used in the recycling path, the slider is removed from the used slide fastener and the remainder of slide fastener is recycled. As concrete examples of the use found for the reclaimed polyamide, the component parts of a slide fastener excepting a slider, face fasteners and other similar fastener products, textile products, and molded articles may be cited. In the case of the slide fastener made of polyamide, similarly to the slide fastener made of polyester mentioned above, the component parts made of polyamide can be simultaneously dyed in the same hue by piece dyeing. As concrete examples of the polyamide which is advantageously used herein, nylon 6, nylon 66, and copolymerized nylon may be cited.

When the cloths, such auxiliary materials as lining cloths, core cloths, and sewing threads, and such resinous accessories as buttons and snaps for garments, bags, tents, etc. on which the recyclable slide fastener made of a synthetic resin according to the present invention is fitted are made of the same or homologous synthetic resin as that of the slide fastener, it is made possible to recover the used products wholly and utilize them for reclamation without requiring the individual component parts thereof to be separated and selected. When the cloth of the working clothes to be used in the fields of removal of asbestos, medical service, automobile coating, and precision machine working, for example, is made of fibers of polypropylene or high-density polyethylene and the slide fastener to be fitted thereon is made wholly of polypropylene, the produced working clothes can be handled as disposable products and, when discarded as no longer useful, can be wholly recovered and recycled. To facilitate discrimination between the products for recycling and those not for recycling, a proper identification mark may be attached to the products for recycling. A visually discernible indication such as, for example, a character, a symbol, or a bar code may be inscribed in the slider or the pin-and-box separator or may be printed on a fastener tape or a product on which a slide fastener is fitted.

When the slide fastener made of synthetic resin according to the present invention is to be discarded and then recycled, the slider and/or the pin-and-box separator is separated and selected, when necessary, from the recovered product and the remainder of the product is optionally washed and dried, thereafter fused or melted, and utilized for reclamation. Alternatively, the remainder may be granulated and then subjected to a proper treatment proper for the kind, object, and use of the synthetic resin.

In regenerating the slide fastener made of synthetic resin, the component parts thereof are formed and the coupling elements made of synthetic resin in a prescribed length are attached fast as regularly spaced to the edges of the fastener tapes made of synthetic resin fibers. In the case of coiled coupling elements, they are sewn to the edges of the fastener tapes with the sewing thread by the use of a sewing machine and then heat set. The coupling elements as attached to the fastener tapes, as occasion demands, are piece dyed in a desired color and then the slider of synthetic resin is fitted to the opposed coupling elements of the produced fastener stringers and the resultant composite is cut to a prescribed length to obtain the slide fastener of the form illustrated in FIG. 1. By fusing the lower ends of the coupling elements which are held in an engaged state, the slide fastener of the form illustrated in FIG. 2 is obtained. Otherwise by fixing the lower stop member of synthetic resin to the lower ends of the coupling elements of a prescribed length on the edges of the fastener tapes, fitting the slider to the opposed coupling elements, then fitting the upper stop members of synthetic resin to the upper ends of the coupling elements, and cutting the opposite end parts of the fastener stringers, the slide fastener of the form illustrated in FIG. 3 is obtained. The slide fastener of the form illustrated in FIG. 4 is obtained by fitting the reinforcing sheet-like members and the pin-and-box separator separated from or integrated with the sheet-like members to the lower end portions of the fastener stringers and the upper stop members to the upper ends of the opposed coupling elements.

The regeneration of the slide fastener from a discarded PET material is advantageously attained by granulating the recovered PET to strand-like chips, subjecting the chips to drying and solid-phase polymerization under a vacuum, and extrusion molding the resultant polymer into a monofilament. Otherwise, the polymer may be molded into a sewing thread or multifilaments of a minute diameter. Alternatively, the polymer may be injection molded to form other component parts. Subsequently, the extrusion molded monofilament is drawn, formed in the shape of a coil, sewn to the edges of fastener tapes obtained by weaving and/or knitting PET fibers, then heat set, and thereafter dyed. What is important in this operation is that the water content of the dry chips be repressed to the lowest possible extent and the decline of the intrinsic viscosity (I.V.) or limiting viscosity number before and after the work of monofilament extrusion be restrained for ensuring manufacture of fastener stringers of prescribed quality. The decline of the intrinsic viscosity before and after the work of monofilament extrusion is considered to. originate in the hydrolysis of the resinous material caused by the water contained in the chips and is liable to induce breakage of the monofilament during the course of drawing. The water content of the dry chips, therefore, should be restrained below 50 ppm (0.005%), preferably below 30 ppm, and more preferably below 20 ppm. Particularly, in the manufacture of such products as sewing threads and multifilaments which have minute diameters, the water content should be kept below 20 ppm, preferably below 10 ppm, and more preferably below 5 ppm in consideration of the possibility of breakage thereof. The intrinsic viscosity of the dry chips is preferred to be so high as to fall in the approximate range of 0.65–0.80, preferably 0.7–0.75, in consideration of the possible decline of viscosity after the work of extrusion molding. For this reason, the temperature of the vacuum drying is preferred to be in the approximate range of 150–190° C. and the temperature of the solid-phase polymerization in the approximate range of 190–200° C.

The discarded plastic materials of the slide fastener can be depolymerized to recover the monomer component. Particularly, nylon 6 can be easily depolymerized to $\epsilon$-caprolactam, the raw material prior to polymerization, when it is heated in the presence of a depolymerization catalyst. Since $\epsilon$-caprolactam boils near 140° C. under a vacuum (about 10 mmHg), it can be easily refined by the method of precision distillation or the method of crystallization refinement to obtain a raw material usable for polymerization. The high-purity $\epsilon$-caprolactam consequently obtained, as occasion demands, can be mixed with virgin $\epsilon$-caprolactam and polymerized by the standard method to produce nylon 6. The nylon 6 reclaimed from the recovered lactam which is obtained as described above may be again reduced to nylon 6 fibers by the technique of melt spinning or molded by the conventional method to afford component parts of a slide fastener or other molded articles.

The slide fastener of synthetic resin according to the present invention can be recycled because it is such that essentially all the component parts thereof are manufactured from one and the same type of synthetic resin material selected from the group consisting of polyamide resins, polyester resins, polyolefin resins, and vinyl chloride resins as described above. It can use as the raw material therefor discarded plastic materials yielded from the production line for slide fasteners made of synthetic resins and discarded slide fasteners made of synthetic resins. The present invention, therefore, can contribute greatly to the conservation of the earth's environment and the effective utilization of resources. Further, since the raw materials for the component parts are unified, the discarded slide fasteners and the discarded plastic materials can be easily recovered for reclamation. Even when the slide fastener made of synthetic resin is manufactured from a discarded plastic material, it is made possible to manufacture a product which satisfies various characteristic properties as varying mechanical properties and the ability to withstand the sliding motion of the slider which are expected of the individual component parts of the slide fastener. When the garments, bags, tents, etc. on which, the recyclable slide fasteners made of synthetic resins according to the present invention are fitted are manufactured from the same synthetic resins as those of the slide fasteners, the products can be wholly recovered and recycled without requiring the individual component parts thereof to be separated and selected.

Particularly, since the slide fasteners which are made of a polyester or nylon allow their component parts to be dyed simultaneously and harmoniously in the same hue by piece dyeing, they can fully meet the needs for manufacturing slide fasteners which are numerous in color and yet small in lot size and permit slide fasteners of synthetic resins of varying color tones to be produced quickly.

Now, the present invention will be described specifically below with reference to working examples.

EXAMPLE 1

The waste PET threads emanating from the production line of slide fasteners made of synthetic resin were ground and granulated by a crush mixer at 180–240° C. The strand-like chips (water content: 1860 ppm) consequently obtained were dried under a vacuum of 0.3 Torr at 160° C. for 12 hours (with the water content lowered consequently to a level in the range of 10–50 ppm) and then subjected to solid-phase polymerization under a vacuum of 0.08 Torr at 190° C. for 12 hours. The resultant resin was extruded at a temperature in the range of 285–305° C. to produce a monofilament, 0.6 mm in diameter. The produced PET monofilament showed thermal shrinkage as shown in Table 1 below.

TABLE 1

| Thermal shrinkage | Waste PET | Specification |
|---|---|---|
| H.S. (180° C.) | 2.03% | 0.2–3.0% |
| B.S. (100° C.) | 0.52% | 0.2–0.6% |

Remark:

TABLE 1-continued

| Thermal shrinkage | Waste PET | Specification |
|---|---|---|

H.S. (dry thermal shrinkage): Shrinkage after heating at 180° C. for 30 minutes and then cooling
B.S. (wet thermal shrinkage): Shrinkage after immersing in boiling water for 30 minutes and then cooling The monofilament obtained as described above was drawn by a three-step drawing treatment to 4.6 times the original length, subjected to coil shaping, sewn to the edges of fastener tapes made of PET fibers, and heat set by the conventional method. Thereafter, the produced fastener stringers were colored with a quinone type disperse dye and subjected to reduction cleaning by the conventional method.

The chips produced from the waste PET, the monofilament manufactured from the chips, and the coiled coupling element obtained after dyeing were tested for the intrinsic viscosity. The results are shown in Table 2 below. For comparison, the data obtained of equivalent products from virgin PET are additionally shown in Table 2.

TABLE 2

| | Intrinsic viscosity (I.V.) | | |
|---|---|---|---|
| | Chips | Monofilament | Dyed coupling element |
| Waste PET | 0.77 | 0.69 | 0.68 |
| Virgin PET | 0.71 | 0.70 | 0.68 |

It is clearly noted from Table 1 given above that the dry thermal shrinkage and the wet thermal shrinkage of the monofilaments produced from the waste PET were on a per with those of the monofilaments produced from the virgin PET and were within the specifications and that the monofilaments from the waste PET were equivalent in size, strength, and extrudability to those from the virgin PET. It is noted from Table 2 that the monofilaments from the waste PET showed the intrinsic viscosity on the same level as the monofilaments from the virgin PET and that they subsequently manifested perfect workability.

In the fastener stringers before and after dyeing, the coupling elements and the fastener tapes showed only meager color difference and they were dyed to a substantially identical color.

The pair of fastener stringers produced as described above were tested for lateral drawing strength and, with a die-cast zinc slider fitted thereto, were tested for resistance to slide and durability. The results are shown in Table 3 below. For comparison, fastener stringers produced from virgin PET were subjected to the same tests and the results consequently obtained are additionally shown in Table 3.

TABLE 3

| | Lateral drawing strength | Resistance to slide (g)*) | | Durability*) | |
|---|---|---|---|---|---|
| | (kgf/inch) | Open | Close | M class | MH class |
| Waste PET | 107.5 | 166 | 202 | Over 5,000 | 3,659 |
| Virgin PET | 106.7 | 209 | 197 | 4,390 | 2,616 |
| Specification | Not less than 60 | Not more than 500 | Not more than 500 | Not less than 500 | Not less than 500 |

Remark
*)The tests were performed in accordance with the method described in Japanese Industrial Standard (JIS) S 3015.

It is noted from Table 3 that the slide fasteners produced from the waste PET showed no decline of lateral drawing strength, produced a light sliding motion, and excelled in durability as compared with those produced from the virgin PET.

EXAMPLE 2

A slide fastener was made wholly of PP. The fastener tapes in this slide fastener were formed of PP multifilaments (mainly in plain weave), 210 d/60 f. The coiled coupling element was formed of a PP monofilament, 0.5 mm in diameter, and sewn to the edges of the fastener tapes mentioned above. The upper sewing thread was formed of a PP monofilament, 0.2 mm in diameter, and the lower sewing thread was formed of a PP hard twist yarn, 200 d/40 f. The produced fastener stringers were heat set at 120° C. Then, an injection molded PP slider was fitted to the fastener stringers. The resultant slide fastener was found to have average lateral drawing strength of 47.5 kgf/inch, average folding strength of 9.8 kgf/inch, and average thrust strength of 21.1 kgf/inch. The tests for these physical strengths were performed in accordance with the method described in JIS S 3015.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. In a slide fastener having a pair of fastener tapes and coupling elements fixed to edges of the fastener tapes, the improvement comprising the fastener tapes and coupling elements manufactured from the same type of synthetic resin material selected from the group consisting of a polyamide resin, a polyolefin resin, and a vinyl chloride resin, and wherein said same type of synthetic resin material is obtained by recycling a discarded plastic material.

2. The slide fastener according to claim 1, which further comprises sewing threads for fixation of said coupling elements to said fastener tapes, said sewing threads being made of the same type of synthetic resin material as said fastener tapes and coupling elements.

3. The slide fastener according to claim 1, which further comprises core cords extended as inserted through the individual coupling elements in the longitudinal direction of said elements, said core cords being made of the same type of synthetic resin material as said fastener tapes and coupling elements.

4. The slide fastener according to claim 1, which further comprises upper stop members fitted respectively to the upper ends of said coupling elements, said upper stop members being made of the same type of synthetic resin material as the other component parts of said slide fastener.

5. The slide fastener according to claim 4, which further comprises a lower stop member fitted to the lower ends of said coupling elements, said lower stop member being made of the same type of synthetic resin material as the other component parts of said slide fastener.

6. The slide fastener according to claim 1, which is an open-link type slide fastener having a pin-and-box separator and a pair of reinforcing sheet-like members fixed respectively to the lower end portions of said fastener tapes, wherein said pin-and-box separator and reinforcing sheet-like members are made of the same type of synthetic resin material as the other component parts of said slide fastener.

7. The slide fastener according to claim 6, wherein said reinforcing sheet-like members are integrated with said pin-and-box separator.

8. The slide fastener according to claim 1, which further comprises a slider which is made of the same type of synthetic resin material as the other component parts of said slide fastener.

9. The slide fastener according to claim 1, wherein said fastener tapes and said coupling elements are dyed in the same hue by means of piece dyeing.

10. In a slide fastener having a pair of fastener tapes and coupling elements fixed to edges of the fastener tapes, the improvement comprising the fastener tapes and coupling elements manufactured from the same type of synthetic resin material selected from the group consisting of a polyamide resin, a polyolefin resin, and a vinyl chloride resin, wherein said synthetic resin material comprises a synthetic resin obtained by reclaiming a discarded plastic material.

11. In a slide fastener having a pair of fastener tapes and coupling elements fixed to edges of the fastener tapes, the improvement comprising the fastener tapes and coupling elements manufactured from the same type of synthetic resin material selected from the group consisting of a polyamide resin, a polyolefin resin, and a vinyl chloride resin, wherein said synthetic resin material comprises a synthetic resin obtained by reclaiming a discarded plastic material, and said fastener tapes and said coupling elements are dyed in the same hue by means of piece dyeing.

* * * * *